UNITED STATES PATENT OFFICE.

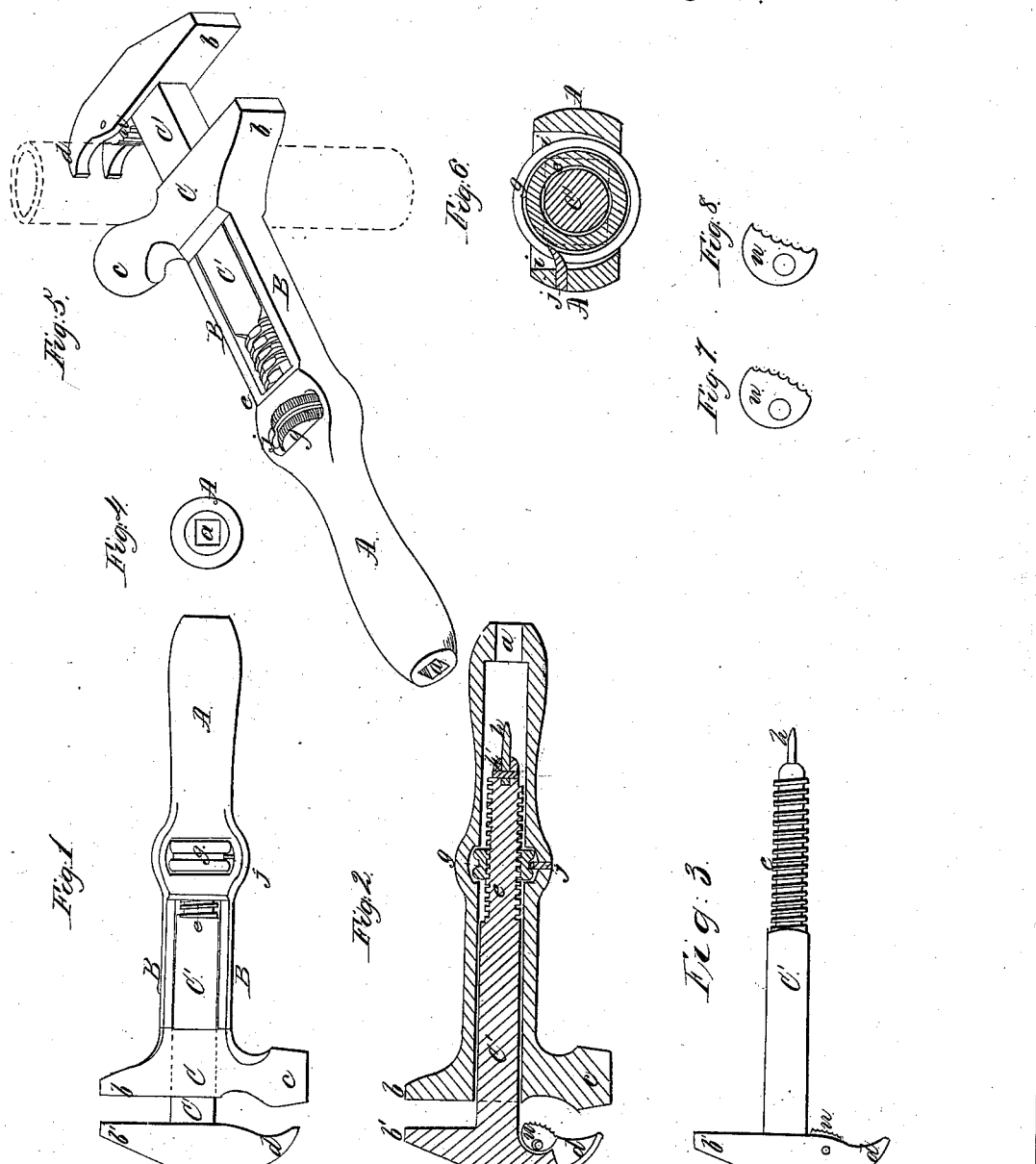

BYRON BOARDMAN, OF NORWICH, CONNECTICUT.

IMPROVED TOOL.

Specification forming part of Letters Patent No. 56,166, dated July 10, 1866.

*To all whom it may concern:*

Be it known that I, BYRON BOARDMAN, of Norwich, in the county of New London and State of Connecticut, have invented an Improved Combination-Tool; and I do hereby declare that the following is a full, clear, and exact description thereof, reference being had to the accompanying drawings, making a part of this specification, in which—

Figure 1 is a view of one side of the improved tool. Fig. 2 is a longitudinal section taken centrally through the same. Fig. 3 is a view of the claw, claw-handle, and its screw-driver detached. Fig. 4 is an end view of the handle of the tool, showing the socket-wrench. Fig. 5 is a perspective view of the tool complete. Fig. 6 is an enlarged view, showing the manner of attaching the adjusting-nut to its handle. Figs. 7 and 8 show two forms of steel cams for the pipe-wrench.

Similar letters of reference indicate corresponding parts in the several figures.

The object of this invention is to combine a pipe-wrench with a monkey-wrench in such manner that two of the jaws of the latter shall serve as griping-jaws for firmly holding rods or pipes of varying diameters which it may be desired to turn.

Another object of my invention is to combine a screw-driver with the stem or shank of the movable jaw of the money-wrench, and, with such combination, to so apply the adjusting-nut for said jaw permanently to its handle that it shall not drop out of place when the screw-driver is withdrawn for use.

Another object of my invention is to apply a screw-driver bit to the stem or shank of the movable jaw, which is made of comparatively-soft metal, all as will be hereinafter described.

To enable others skilled in the art to understand my invention, I will describe its construction and operation.

In the accompanying drawings, A represents the handle of the tool, which is cast hollow, with a rectangular socket, *a*, in one end that serves as a nut-wrench. This handle has two parallel bars, B B, formed on it, which terminate in a head, C, one end, *b*, of which forms one of the jaws of the monkey-wrench, and the opposite end forms a hammer, *c*. The movable jaw *b'* is formed on a rectangular shank, C', and on the opposite end of this jaw *b'* is a claw, *d*, for drawing nails. The shank C' has a male screw, *e*, formed on it, which passes through a nut, *g*, and enters the hollow handle A when the parts of the tool are together. That end of the screw portion of said shank which enters the handle of the tool is slotted transversely for the purpose of receiving a steel screw-driver bit, *h*, that is held firmly in place by the rivet *h'*, as shown in Fig. 2. This admits of the shank C', with the T-head claw and jaw, being used as a screw-driver when detached from the other portion of the tool. And as it is necessary to detach the parts above mentioned when the screw-driver is used, it is important that the nut *g* should be permanently attached to the handle. To this end a recess, *i*, is formed in the handle, which will admit the nut through one side only, the opposite side or opening being narrower than the diameter of the nut, as I have shown in Fig. 6. When the nut *g* is dropped into its recess *i* a pin, *j*, is passed through the solid metal at one end of said recess, so as to enter an annular groove in the periphery of the nut, and as this pin is nearest that side of the handle where the recess is the largest it will prevent the nut from dropping out of its place, yet allow it to be rotated freely.

The object of securing the bit *h* to the end of the shank C', rather than forming a bit on this shank, is to enable me to make the shank of cast metal, and to have a more durable and stronger bit than could be made of cast metal.

Just at the junction of the claw *a* with the shank C', I form a curved recess, as shown in Fig. 2, within which is loosely fitted a steel or other hard-metal jaw or cam, *n*, having either a concave serrated or a convex serrated biting-edge. This cam *n* is connected to the claw-head by means of a pin or otherwise, so as to allow the cam to roll or move loosely and take a firm bite upon a pipe which is held against it by the hammer-head, as indicated in Fig. 5. The cam is also made to work loosely about its pivot pin or pins, for the purpose of allowing it to seek a firm bearing against the curved surface of its recess. By this arrangement there will be no joints or pins to bear the strain upon the cam, and to break or give under the great pressure to which the cam is subjected in grasping cylindrical objects.

Instead of applying the cam *n* to the clawjaw of the wrench, it may be applied to the hammer-head, or, if desirable, two cams may be used and applied to the movable and fixed jaws.

Having thus described my invention, what I claim as new, and desire to secure by Letters Patent, is—

1. As an improvement in monkey-wrenches, the combination of a cam, n, with the movable or fixed jaw-head of a monkey-wrench, so applied as to form thereof a pipe-wrench, substantially as described.

2. The manner herein described of securing the pipe-wrench cam within a recess, so that this cam will be firmly sustained by the solid metal surrounding it during the operation of turning a cylindrical object, and allowed to play loosely when released, substantially as described.

3. Securing the nut g within an oblong slot, i, in the handle A by means of the fixed pin j, substantially as described.

4. The combination of the permanently-attached nut g and the screw-driver bit h, formed on or applied to the shank C' of a monkey-wrench, substantially as described.

5. Securing a steel bit, h, to the end of the softer metal shank C' of the monkey-wrench, substantially as described.

BYRON BOARDMAN.

Witnesses:
JAMES BOARDMAN,
GEO. G. BOTTOM.